(12) United States Patent
Ummelmann et al.

(10) Patent No.: US 9,923,500 B1
(45) Date of Patent: Mar. 20, 2018

(54) GATE-DRIVER CIRCUIT WITH IMPROVED COMMON-MODE TRANSIENT IMMUNITY

(71) Applicant: Infineon Technologies AG, Neubiberg (DE)

(72) Inventors: Detlef Ummelmann, Munich (DE); Ansgar Pottbaecker, Grafing (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/264,444

(22) Filed: Sep. 13, 2016

(51) Int. Cl.
*H02P 7/06* (2006.01)
*H02P 6/14* (2016.01)

(52) U.S. Cl.
CPC . *H02P 7/06* (2013.01); *H02P 6/14* (2013.01)

(58) Field of Classification Search
USPC .......... 318/287, 293, 294, 430–434, 558
See application file for complete search history.

(56) References Cited

U.S. PATENT DOCUMENTS

| | | | | |
|---|---|---|---|---|
| 5,225,687 A | * | 7/1993 | Jason | H03K 17/063 |
| | | | | 250/551 |
| 5,339,042 A | * | 8/1994 | Kaire | H03F 3/45479 |
| | | | | 330/255 |
| 6,362,679 B2 | * | 3/2002 | Wile | H03K 17/063 |
| | | | | 327/333 |
| 6,563,368 B2 | * | 5/2003 | Ferianz | G05F 3/08 |
| | | | | 323/315 |
| 7,180,337 B2 | | 2/2007 | Feldtkeller | |

FOREIGN PATENT DOCUMENTS

DE  10346307 B3  12/2004

OTHER PUBLICATIONS

Schindler et al., "Gate Driver with 10 /15ns In-Transition Variable Drive Current and 60% Reduce Current Dip," 42nd European Solid-State Circuits Conference, Sep. 12-15, 2016, 4 pp.
"L99DZ80EP," STMicroelectronics, Data Sheet, Sep. 2013, 68 pp.
"L99ASC03," STMicroelectronics, Data Sheet, Aug. 2015, 73 pp.

\* cited by examiner

*Primary Examiner* — Bentsu Ro
(74) *Attorney, Agent, or Firm* — Shumaker & Sieffert, P.A.

(57) ABSTRACT

Techniques are described for providing, in a gate driver circuit, a compensation current to compensate for parasitic displacement current induced during the rising edge of an output voltage at an output gate of the gate driver circuit. In one example, the techniques of the disclosure include activating, by a bridge driver circuit for a direct-current (DC) motor, a driver of the bridge driver circuit and measuring, by the bridge driver circuit, a parasitic current of the driver during a rise time of an output gate voltage of the driver. In response to the measured parasitic current, generating, by the bridge driver circuit, a compensation current; and outputting, by the bridge driver circuit and to the output gate of the of the driver, the compensation current.

16 Claims, 6 Drawing Sheets

GATE-DRIVER CIRCUIT WITH IMPROVED COMMON-MODE TRANSIENT IMMUNITY

TECHNICAL FIELD

This disclosure generally relates to gate driver circuits for driving power transistors.

BACKGROUND

A gate driver is a power amplifier that accepts a low-power input from a controller IC and produces a high-current drive input for the gate of a high-power transistor such as an Insulated Gate Bipolar Transistor (IGBT) or power metal-oxide-semiconductor field-effect transistor (MOSFET). A gate driver typically includes a level shifter circuit in combination with an amplifier. A level shifter is an electrical component that converts digital signals from a low-side voltage domain to into a high-side voltage domain. The input signals are provided in reference to the low-side domain, while the output signals provided in reference to the high-side domain. Both the low-side and high-side are separate and electrically isolated from each other.

Gate drivers are typically used to drive inductive loads. For example, a motor bridge driver can be used to drive H-bridge or three-phase brushless direct current (DC) motors. One issue with current-controlled high-side gate drivers is that, in a motor driver application, the output current of the gate driver may be sensitive to rapidly changing common mode voltage transients. This sensitivity is caused by parasitic capacitance, especially the gate-drain capacitance of the driver's output transistors. Because of current consumption and settling time limitations, a typical current-controlled gate driver circuit cannot maintain a constant output current during a short common mode voltage rise time (e.g. 50 ns). As a result, a current dip (or at least a current reduction) occurs during the rising edge of the common mode voltage.

SUMMARY

In general, the disclosure describes techniques for a gate driver circuit that has an improved common-mode transient immunity. In one example, the gate driver circuit of the present disclosure generates a compensation current to compensate for parasitic drain-gate displacement current during the rising edge of the common mode voltage. When the gate driver circuit turns on, a rising edge in output voltage is created. The gate driver circuit detects current dips induced by rapidly changing common mode voltage transients during the rising edge and outputs a compensation current to suppress these current dips.

Accordingly, a gate driver circuit according to the techniques of the disclosure may provide a constant output current during a short common mode voltage rise time. Further, by providing a compensation current in the manner described below, the gate driver circuit as disclosed herein compensates for parasitic displacement current during the common mode voltage rise time. Thus, in contrast to other gate driver circuits, such a gate driver circuit as disclosed herein may have an improved common-mode transient immunity and may not suffer the same current dips in output current during the common mode voltage rise time.

In one example, this disclosure describes a method, including: activating, by a bridge driver circuit for a direct-current (DC) motor, a driver of the bridge driver circuit; determining, by the bridge driver circuit, a parasitic current of the driver during a rise time of an output gate voltage of the driver; in response to the determined parasitic current, generating, by the bridge driver circuit, a compensation current; and outputting, by the bridge driver circuit and to the output gate of the of the driver, the compensation current.

In another example, this disclosure describes a bridge driver for a direct-current (DC) motor configured to: activate a driver of the bridge driver circuit; determine a parasitic current of the driver during a rise time of an output gate voltage of the driver; in response to the determined parasitic current, generate a compensation current; and output, to the output gate of the of the driver, the compensation current.

In another example, this disclosure describes a system, including: a bridge driver for a direct-current (DC) motor configured to: activate a driver of the bridge driver circuit; determine a parasitic current of the driver during a rise time of an output gate voltage of the driver; in response to the determined parasitic current, generate a compensation current; and output, to the output gate of the of the driver, the compensation current; and the DC motor.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
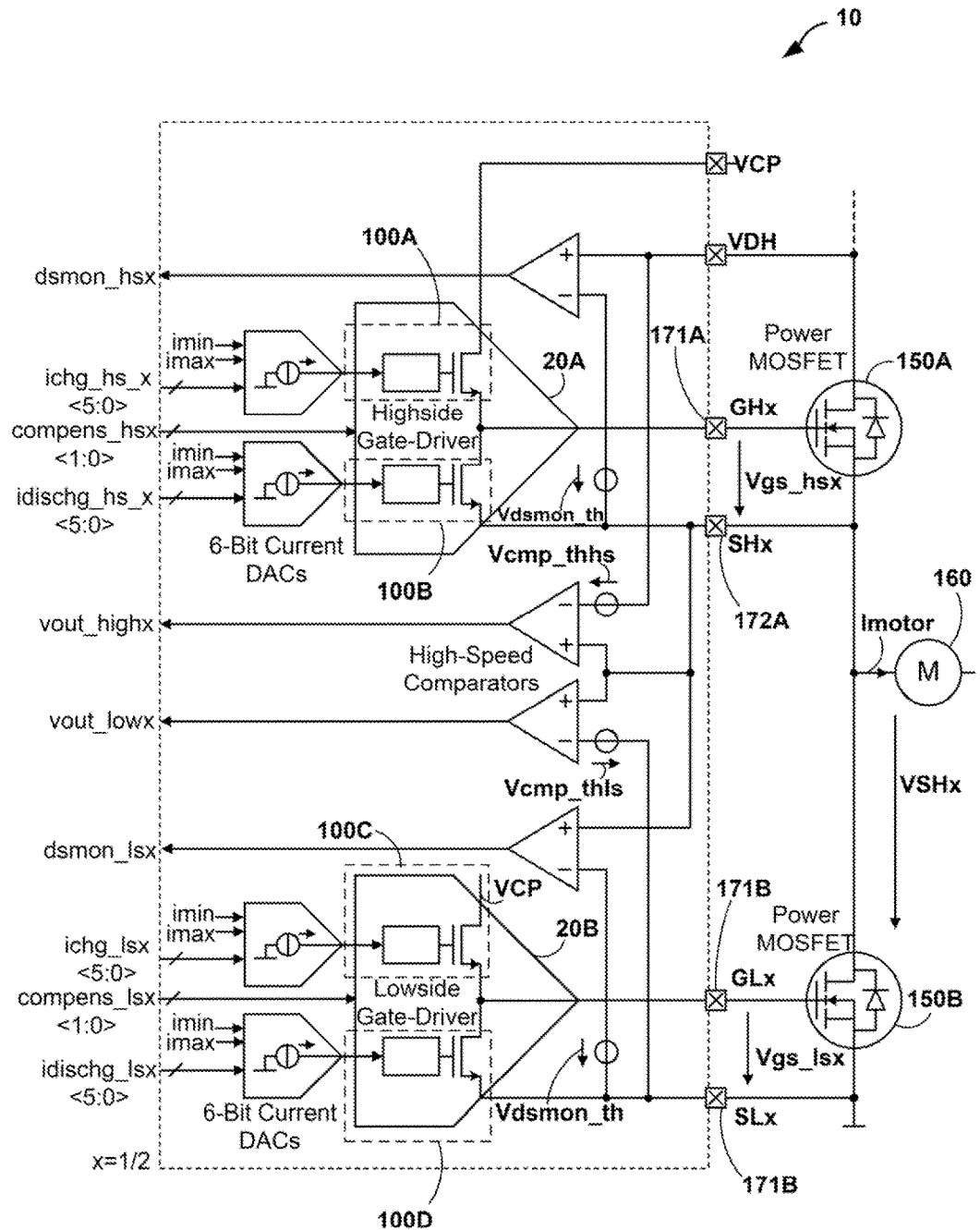
FIG. 1 is a block diagram illustrating an example system for driving a motor according to the techniques of the disclosure.

FIG. 1 is a block diagram illustrating an example system 10 for driving a direct-current (DC) motor 160 according to the techniques of the disclosure. System 10 includes a high-side gate driver circuit 20A for driving a high-side power MOSFET 150A and a low-side gate driver circuit 20B for driving a low-side power MOSFET 150B. High-side power MOSFET 150A and low-side power MOSFET 150B provide current for driving motor 160. High-side gate driver circuit 20A includes a first gate driver 100A for charging the gate of power MOSFET 150A and a second gate driver 100B for discharging the gate of power MOSFET 150A. Similarly, low-side gate driver circuit 20B includes a first gate driver 100C for charging the gate of power MOSFET 150C and a second gate driver 100D for discharging the gate of power MOSFET 150B. Gate drivers 100A-100D are collectively referred to herein as "gate drivers 100."

According to the techniques of the disclosure, each of gate drivers 100 generates a compensation current to compensate for parasitic drain-gate displacement current during the rising edge of common mode voltage. As described to herein, the common mode voltage refers to one of a voltage $G_{Hx}$ 171A at the base of the high-side power MOSFET 150A, a voltage $S_{Hx}$ 172A at the source of the high-side power MOSFET 150A, a voltage $G_{Lx}$ 171B at the base of the low-side power MOSFET 150B, or a voltage $S_{Lx}$ 172B at the source of the low-side power MOSFET 150B.

When one of gate drivers 100 turns on, a rising edge in output voltage is created at the output gate of the gate driver. During this rising edge, the gate driver 100 experiences rapidly changing common mode voltage transients which induce current dips at the node. For example, when gate driver 100A activates, a rising edge in output voltage at output node $G_{Hz}$ 171A is created. Further, output node $G_{Hz}$ 171A experiences rapidly changing common mode voltage transients which induce current dips at the node. The gate driver 100A detects current dips at output node $G_{Hz}$ 171A induced by rapidly changing common mode voltage transients during the rising edge. In response to the common mode voltage transients, gate driver 100A outputs a compensation current to suppress the effects of these current dips.

Typically, the gate drivers 100 configured to charge the respective power transistor (e.g., gate drivers 100A and 100C) experience rapidly changing common mode voltage transients at the output node (e.g., $G_{Hx}$ 171A and $G_{Lx}$ 171B, respectively) during the rising edge in output voltage. Further, gate driver 100B may experience rapidly changing common mode voltage transients at the output node $S_{Hx}$ 172A during the rising edge of output voltage at $G_{Hx}$ 171A. However, gate driver 100D typically does not experience such common mode voltage transients at output node $S_{Lx}$ 172B, due to it proximity to ground. Accordingly, examples are described with respect to the gate drivers 100 configured to charge the respective power transistor (e.g., gate drivers 100A and 100C). However, the techniques of the disclosure may be applied to any gate driver to improve the common-mode transient immunity of the gate driver, such as gate drivers 100 configured to discharge the respective power transistor (e.g., gate drivers 100B and 100D).

The gate drivers 100 set forth in this disclosure may be suitable for any type of vehicle, for example, automobiles, such as cars, trucks, and sport utility vehicles (SUV), watercraft and ships, aircraft, military vehicles, such as tanks, jeeps, and half-tracks, amphibious vehicles, transportation vehicles, such as semi-trucks and trailers, construction vehicles, such as bulldozers, tractors, backhoes, and cranes, heavy machinery, trains, motorcycles, mopeds, recreational vehicles such as golf carts, dune buggies, and all-terrain vehicles (ATV), and many other types of vehicles not explicitly described herein.

Accordingly, a gate driver circuit according to the techniques of the disclosure may provide a constant output current during a short common mode voltage rise time. Further, by providing a compensation current in the manner described below, the gate driver circuit as disclosed herein compensates for parasitic displacement current during the common mode voltage rise time. Thus, in contrast to other gate driver circuits, such a gate driver circuit as disclosed herein may have an improved common-mode transient immunity and may not suffer the same current dips in output current during the common mode voltage rise time.

Figure 2:
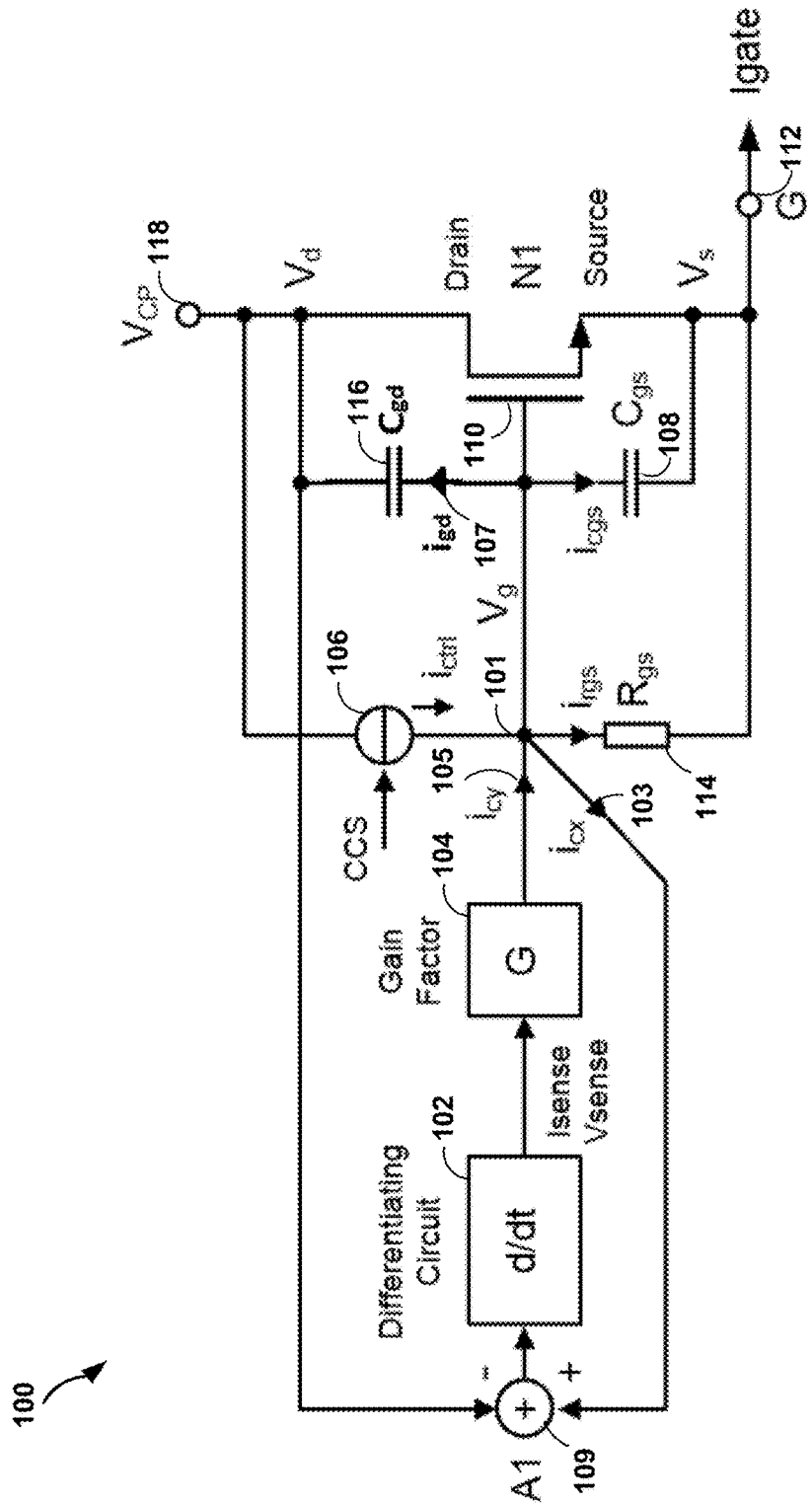
FIG. 2 is a block diagram illustrating in further detail an example gate driver of FIG. 1 for generating a compensation current in response to a parasitic displacement current according to the techniques of the disclosure.

FIG. 2 is a block diagram illustrating in further detail an example gate driver 100 of FIG. 1 for generating a compensation current $i_{cy}$ in response to a parasitic displacement current $i_{gd}$ according to the techniques of the disclosure. The example gate driver 100 of FIG. 2 includes a feedback loop comprised of an adder 120, a differentiating circuit 102, and a gain factor amplifier 104 for generating and outputting the compensation current $i_{cy}$. In some examples, parasitic displacement current $i_{gd}$ 107 arises due to parasitic capacitance $C_{gd}$ 116, a parasitic capacitance between a voltage $V_g$ of a gate of transistor 112 and a voltage $V_d$ of a drain of transistor 112 that arises during a rising edge of voltage $V_g$ on output gate 114.

Gate driver 100 further includes a constant current source (CCS) 106 that outputs a constant current $i_{ctrl}$ into node 101 for activating transistor 110. A current $i_{rgs}$ flows from node 101, through resistor $R_{gs}$ 114, and into output gate node 112. The value of current $i_{rgs}$ may be set by selecting values of resistor $R_{gs}$ 114.

Adder circuit 109 is a circuit that adds the sum of its inputs. In one example, adder 109 is an analog adder that outputs a voltage or current signal equal to the sum of two inputs. In the example of FIG. 2, adder circuit 109 receives an input from source voltage $V_{cp}$ 118 of a charge pump regulator and an input current $i_{cx}$. In response to these inputs, adder circuit 109 generates an output equal to the sum of the two inputs.

Differentiating circuit 102 is a circuit wherein the output of the circuit is approximately directly proportional to the rate of change (the time derivative) of the input. In one example, differentiating circuit 102 is an active differentiating circuit that includes some form of amplifier, typically, a differential amplifier. In another example, differentiating circuit 102 is a passive differentiating circuit that comprises only passive components, such as resistors and capacitors.

Gain circuit 104 is a circuit that receives an input current $I_{sense}$ and multiplies the input current $i_{sense}$ by a factor N to generate an output current $i_{cy}$ 105, wherein the magnitude of $i_{cy}$ 105 equal to $N*i_{sense}$. N is typically an integer. In one example, the value of N is selected at design. In another example, the value of N is selected during implementation of gate driver 100 and adjusted to account for manufacturing variances present in the components of a specific gate driver 100. In the example of FIG. 2, the value of N, e.g., the gain of gain circuit 104, is selected such that the compensation current $i_{cy}$ 105 is equal to the sum of the input current $i_{cx}$ and the parasitic drain current $i_{gd}$ 107.

Transistor N1 110 is a power transistor that, in response to a low-side input at the gate of transistor 110, activates a high-side output gate 112 of gate driver 100 by connecting a high-side voltage source $V_{cp}$ to high-side output gate 112. In some examples, $V_{cp}$ is provided by a charge pump regulator. In some examples, transistor 110 is a metal-oxide-semiconductor field-effect transistor (MOSFETs) or a bipolar junction transistor (BJTs). In some examples, transistor 110 is a power MOSFET. In some examples, transistor 110 is an insulated gate bipolar transistor (IGBT). In some examples, transistor 110 is a vertical BJT. In other examples, transistor 110 is a vertical MOSFET. In some examples, transistor 110 is a vertical source-down or source-up transistor. In some examples, transistor 110 is a lateral MOSFET. In some examples, transistor 110 is a lateral n-type channel MOSFET built on a p-type substrate. In some examples, transistor 110 is a lateral n-type channel MOSET built on Silicon-on-Insulator (SOI) substrate. In some examples, transistor 110 is a superjunction MOSFET. In some examples, transistor 110 has high switching speed and low gate charge. In some examples, transistor 110 has low capacitance from drain to source and from drain to substrate.

Capacitance $C_{gd}$ 116 is a parasitic capacitance between a voltage $V_g$ of a gate of transistor 112 and a voltage $V_d$ of a drain of transistor 112 that arises during a rising edge of voltage $V_g$ on output gate 114. Similarly, capacitor $C_{gs}$ 108 is a parasitic capacitance between voltage $V_g$ of the gate of transistor 112 and a voltage $V_s$ of a source of transistor 112 that arises during a rising edge of voltage $V_g$ on output gate 114. Capacitances $C_{gd}$ 116 and $C_{gs}$ 108 are not necessarily physical capacitors, but arise due to non-ideal capacitive and inductive characteristics of components of gate driver 100 experienced in physical implementation. Typically, capacitances $C_{gd}$ 116 and $C_{gs}$ 108 are unwanted characteristics and may interfere with the predicted operation of a gate driver circuit.

According to the techniques of the disclosure, when constant current source 106 turns on, a rising edge in output voltage at output gate 114 is created. During this rising edge, gate driver 100 experiences rapidly changing common mode voltage transients which induce current dips in node 101. In other words, due to the parasitic capacitance $C_{gd}$, during the rising edge of output voltage at output gate 114, current flows into capacitor $C_{gd}$ as displacement current $i_{gd}$, which reduces current output $i_{rgs}$ to the output gate 114. Typically, these current dips are caused by displacement current due to gate-drain capacitance $C_{gd}$ 116 of an output transistor (e.g., parasitic displacement current $i_{gd}$).

According to the techniques of the disclosure, gate driver 100 detects the parasitic current $i_{gd}$ 107 by detecting changes in input current $i_{cx}$. Adder circuit 109 sums an input from source voltage $V_{cp}$ and input current $i_{cx}$, and provides the sum as an output to differentiating circuit 102. In response to the summed output, indicative of the detected parasitic current, differentiating circuit 102 generates a sense current $I_{sense}$ that is approximately proportional to the slew rate, defined by:

$$\frac{d(V_g - V_d)}{dt}$$

In other examples, differentiating circuit 102 generates a sense voltage $V_{sense}$ instead of a sense current. In a typical implementation, differentiating circuit 102 generates a positive output value only when the input voltage is rising, and generates an output of zero when the input voltage is falling.

Gain circuit 104 receives the sense current $I_{sense}$ (alternatively, $V_{sense}$) and multiplies the sense value by a factor of N to generate a compensation current $i_{cy}$ 105. Gain circuit 104 outputs the compensation current $i_{cy}$ 105 into node 101, to compensate for the displacement current $i_{gd}$. The compensation current $i_{cy}$ 105 flows into output gate 112 to prevent any displacement current $i_{gd}$ from diminishing the current output at gate 112.

Thus, during the rising edge of voltage $V_g$ on output gate 114, the parasitic displacement current $i_{gd}$ 107 is negated via a compensation current $i_{cy}$ 105, as described above. Thus, the compensation current $i_{cy}$ 105 flowing into node 101 is substantially equal to the sense current $i_{cx}$ 103 and parasitic displacement current $i_{gd}$ 107 flowing from node 101. Accordingly, the difference between the voltage $V_g$ of the gate of transistor 112 and the voltage $V_s$ of the source of transistor 112 remains the same. Furthermore, during this rising edge, the parasitic current $i_{cgs}$ due to capacitance $C_{gs}$ between the voltage $V_g$ of the gate of transistor 112 and the voltage $V_s$ of the source of transistor 112 is typically zero. Therefore, supply current $i_{ctrl}$ is equal to output gate current $i_{rgs}$ at output gate 112, even with varying levels of parasitic displacement current $i_{gd}$.

In some examples, the techniques of the disclosure include design techniques to minimize the delay time of the compensation current loop formed by input current $i_{cx}$, differentiating circuit 102, gain circuit 104, and compensation current $i_{cy}$, such that the delay time of the compensation current loop is significantly shorter than the rise time of the output voltage. For example, in a substantially compensated gate driver circuit, the delay of the compensation current loop is significantly shorter than the rise and fall time of the output voltage at output gate 114.

Such a gate driver 100 may be used to drive inductive loads. In one example, the gate driver 100 drives an H-bridge or three-phase brushless DC motor. In one example, gate driver 100 drives a DC motor in a vehicle application, such as a power window motor or a power lock motor. Similarly, the techniques of the disclosure may be used to compensate for parasitic displacement current in a level shifter circuit.

Accordingly, a gate driver circuit according to the techniques of the disclosure may provide a constant output current during a short common mode voltage rise time. Further, by providing a compensation current in the manner described below, the gate driver circuit as disclosed herein compensates for parasitic displacement current during the common mode voltage rise time. Thus, in contrast to other gate driver circuits, such a gate driver circuit as disclosed herein may have an improved common-mode transient immunity and may not suffer the same current dips in output current during the common mode voltage rise time.

The architecture of gate driver 100 illustrated in FIG. 2 is shown as an example. The techniques as set forth in this disclosure may be implemented in the example gate driver 100 of FIG. 2, as well as other types of gate driver circuits not described specifically herein. Nothing in this disclosure should be construed so as to limit the techniques of this disclosure to the example architecture illustrated by FIG. 2.

Figure 3:
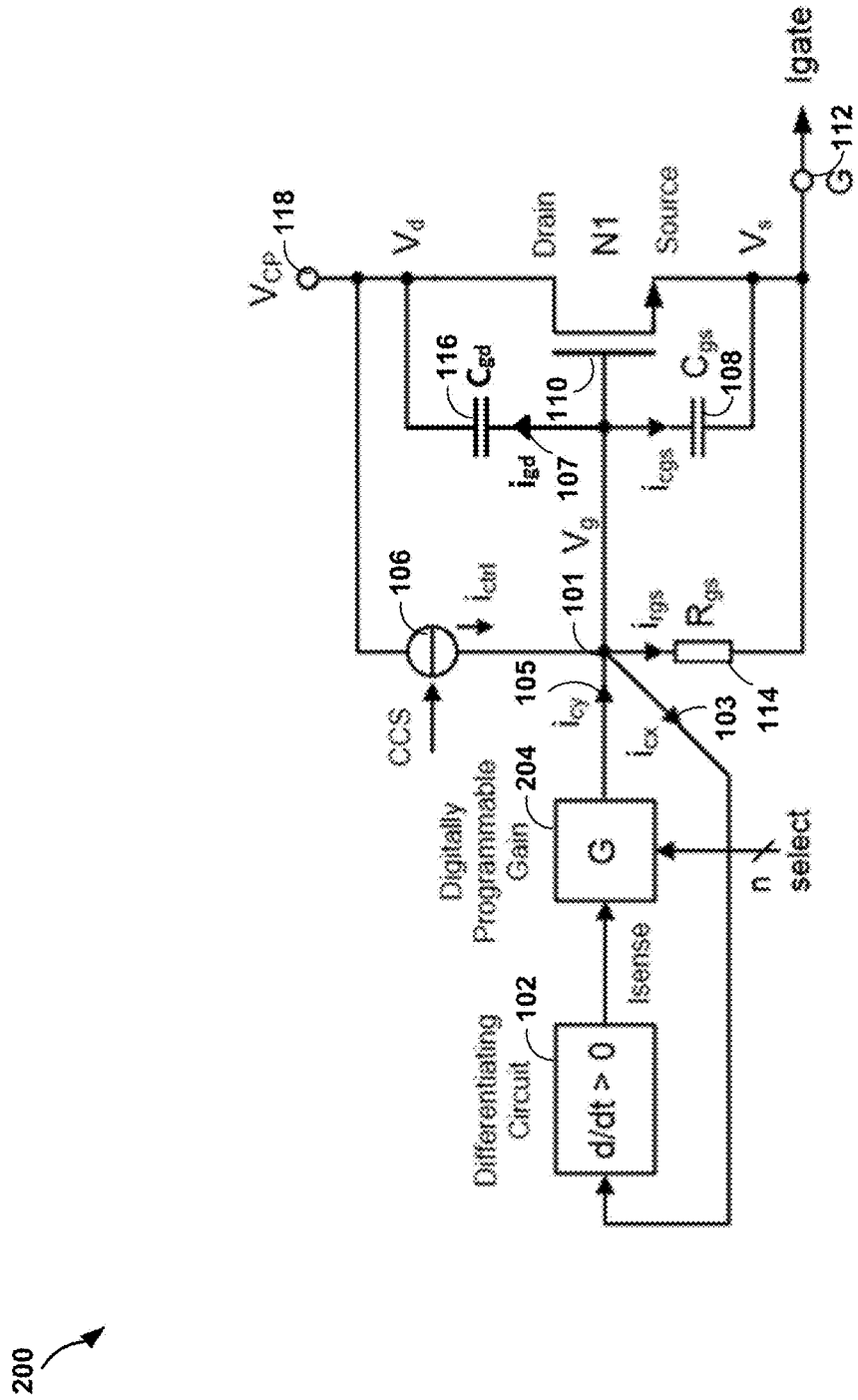
FIG. 3 is a block diagram illustrating an example gate driver for generating a compensation current in response to a parasitic displacement current according to the techniques of the disclosure.

FIG. 3 is a block diagram illustrating an example gate driver 200 for generating a compensation current in response to a parasitic displacement current according to the techniques of the disclosure. The gate driver 200 of FIG. 3 is substantially similar to the gate driver 100 of FIG. 2. However, gate driver 200 omits the adder 109 of gate driver 100 without affecting the detection and suppression of current dips due to parasitic displacement current during the common mode voltage rise time.

The drain of transistor 110 is connected to a supply voltage $V_{cp}$ 118, which typically comprises a charge pump regulator. Typically, such a charge pump regulator includes a large blocking capacitor such that any voltage ripple at the drain terminal of transistor 110 is negligible as compared to the voltage rise $V_g$ at the gate of transistor 110. Thus, in the example of FIG. 3, the gate driver 200 omits the adder 109 of gate driver 100, without materially affecting the ability of gate driver 200 to detect and suppress current dips due to parasitic displacement current during the common mode voltage rise time.

Digitally programmable gain circuit 204 is a circuit that receives an input current $I_{sense}$ and multiplies the input current $I_{sense}$ by a factor N to generate an output current $i_{cy}$ 105, wherein the magnitude of $i_{cy}$ 105 equal to $N*i_{sense}$. N is typically an integer. Digitally programmable gain circuit 204 differs from gain circuit 104 in that the value of N is digitally configurable and may be adjusted by a microcontroller while gate driver 200 is in operation. In one example, the value of N is selected at design. In another example, the value of N is selected during implementation of gate driver 100 and adjusted to account for manufacturing variances present in the components of a specific gate driver 100. In yet another example, the value of N is selected during operation of gate driver 100 and adjusted to account for dynamic changes in gate driver 200 due to temperature, current or voltage load, or other ambient conditions. In the example of FIG. 3, the value of N, e.g., the gain of gain circuit 104, is selected such that the compensation current $i_{cy}$ 105 is equal to the sum of the input current $i_{cx}$ and the parasitic drain current $i_{gd}$ 107.

According to the techniques of the disclosure, when constant current source 106 turns on, a rising edge in output voltage at output gate 114 is created. During this rising edge, gate driver 200 experiences rapidly changing common mode voltage transients which induce current dips in node 101. In other words, due to the parasitic capacitance $C_{gd}$, during the rising edge of output voltage at output gate 114, current flows into capacitor $C_{gd}$ as displacement current $i_{gd}$, which reduces current output $i_{rgs}$ to the output gate 114. Typically, these current dips are caused by displacement current due to gate-drain capacitance $C_{gd}$ 116 of an output transistor (e.g., parasitic displacement current $i_{gd}$).

Differentiating circuit detects the parasitic current $i_{gd}$ 107 by detecting changes in input current $i_{cx}$. In response to the detected parasitic current, differentiating circuit 102 generates a sense current $I_{sense}$ that is approximately proportional to the slew rate, defined by:

$$\frac{d(V_g - V_d)}{dt}$$

In other examples, differentiating circuit 102 generates a sense voltage $V_{sense}$ instead of a sense current. In a typical implementation, differentiating circuit 102 generates a positive output value only when the input voltage is rising, and generates an output of zero when the input voltage is falling.

Digitally programmable gain circuit 104 receives the sense current $I_{sense}$ (alternatively, $V_{sense}$) and multiplies the sense value by a factor of N to generate a compensation current $i_{cy}$ 105. Digitally programmable gain circuit 104 outputs the compensation current $i_{cy}$ 105 into node 101, to compensate for the displacement current $i_{gd}$. The compensation current $i_{cy}$ 105 flows into output gate 112 to prevent any displacement current $i_{gd}$ from diminishing the current output at gate 112.

Thus, during the rising edge of voltage $V_g$ on output gate 114, the parasitic displacement current $i_{gd}$ 107 is negated via a compensation current $i_{cy}$ 105, as described above. Thus, the compensation current $i_{cy}$ 105 flowing into node 101 is substantially equal to the sense current $i_{cx}$ 103 and parasitic displacement current $i_{gd}$ 107 flowing from node 101. Accordingly, the difference between the voltage $V_g$ of the gate of transistor 112 and the voltage $V_s$ of the source of transistor 112 remains the same. Furthermore, during this rising edge, the parasitic current $i_{cgs}$ due to capacitance $C_{gs}$ between the voltage $V_g$ of the gate of transistor 112 and the voltage $V_s$ of the source of transistor 112 is typically zero.

Therefore, supply current $i_{ctrl}$ is equal to output gate current $i_{rgs}$ at output gate 112, even with varying levels of parasitic displacement current $i_{gd}$.

Such a gate driver 200 may be used to drive inductive loads. In one example, the gate driver 200 drives an H-bridge or three-phase brushless direct current (DC) motor. In one example, gate driver 200 drives a DC motor in a vehicle application, such as a power window motor or a power lock motor. Similarly, the techniques of the disclosure may be used to compensate for parasitic displacement current in a level shifter circuit.

Accordingly, a gate driver circuit according to the techniques of the disclosure may provide a constant output current during a short common mode voltage rise time. Further, by providing a compensation current in the manner described below, the gate driver circuit as disclosed herein compensates for parasitic displacement current during the common mode voltage rise time. Additionally, by omitting the adder 109 of gate driver 100, gate driver 200 may be cheaper to implement than other gate driver circuits. Thus, in contrast to other gate driver circuits, such a gate driver circuit as disclosed herein may have an improved common-mode transient immunity and may not suffer the same current dips in output current during the common mode voltage rise time.

The architecture of gate driver 200 illustrated in FIG. 3 is shown as an example. The techniques as set forth in this disclosure may be implemented in the example gate driver 200 of FIG. 3, as well as other types of gate driver circuits not described specifically herein. Nothing in this disclosure should be construed so as to limit the techniques of this disclosure to the example architecture illustrated by FIG. 3.

Figure 4:
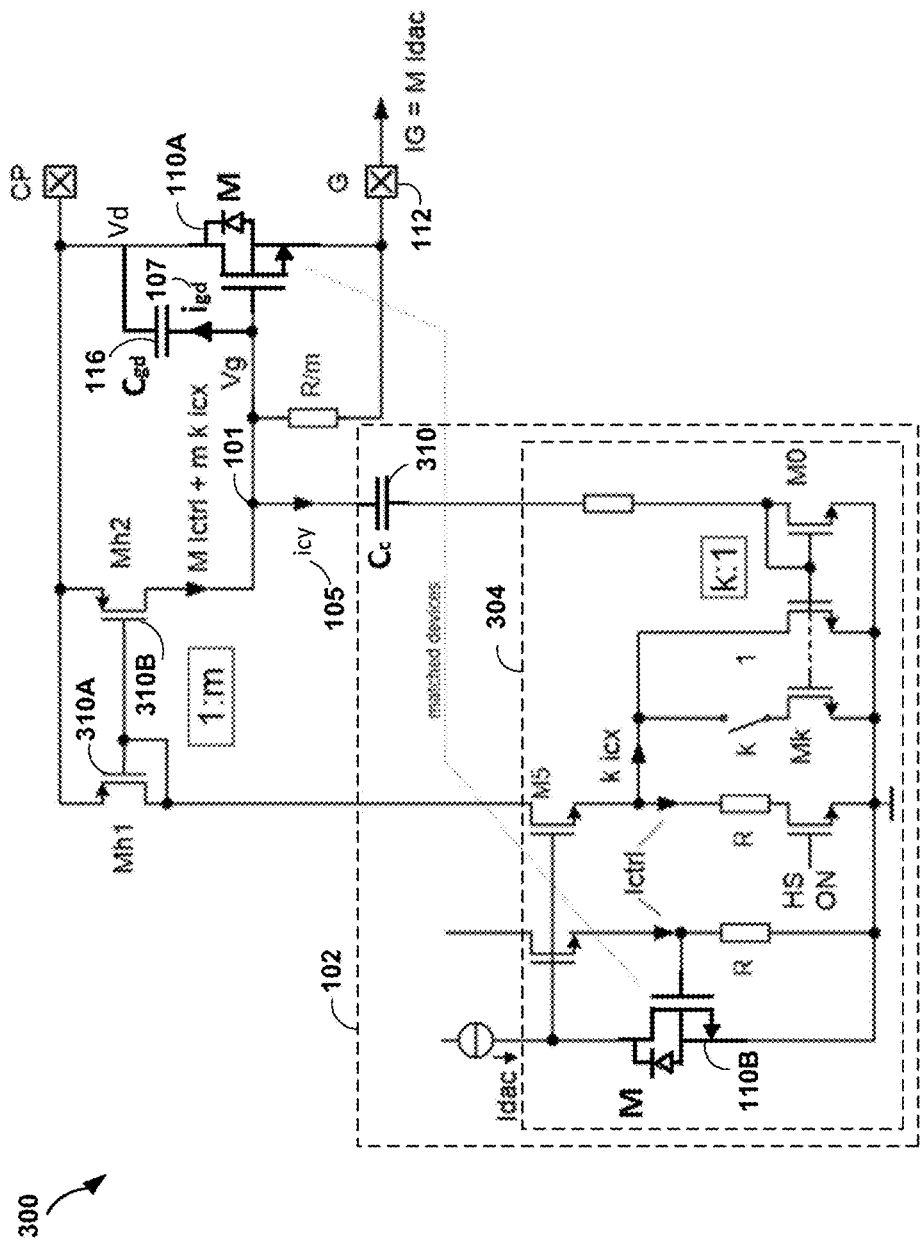
FIG. 4 is a block diagram illustrating an example gate driver for generating a compensation current in response to a parasitic displacement current according to the techniques of the disclosure.

FIG. 4 is a block diagram illustrating an example gate driver 300 for generating a compensation current in response to a parasitic displacement current according to the techniques of the disclosure. The gate driver 200 of FIG. 4 may operate in a substantially similar fashion to the gate driver 100 of FIG. 2. Further, in the example of FIG. 4, the gate driver 300 includes protection devices, cascodes, and voltage limitation circuitry, the implementation of which are not depicted herein for clarity but would be apparent to a person of ordinary skill in the art.

In the example of FIG. 4, the differentiating circuit 102 comprises a compensation capacitor $C_c$ 310 and a current mirror 304 including transistors M0-Mk. As the current through output gate 112 varies, the ratio of the voltage $V_g$ of the gate of transistor 110A to the voltage $V_d$ of the drain of transistor 110A changes only slightly in comparison to the large common mode voltage step at output gate 112. Accordingly, the compensation current $i_{cy}$ 105 becomes approximately proportional to the slew rate of voltage $V_g$. The differentiating circuit 102 generates a compensation current $i_{cy}$ 105 only during the rising edge of output gate $V_g$. During the rising edge of output gate $V_g$, input current $I_{sense}$ is typically zero.

Compensation capacitor $C_c$ 310 is a capacitor configured to discharge during the rising edge of an output voltage at gate 112 such that capacitor 310 provides a compensation current $i_{cy}$ 105 to compensate for parasitic displacement current $i_{gd}$ 107 during induced by rapidly changing common mode voltage transients during the rising edge. In other words, capacitor 310 is a first order capacitor that tracks the behavior of capacitor $C_{gd}$. A value of $C_c$ is selected such that the output current of Cc is proportional to the slew rate of $V_g$ of $T_m$. Capacitor 310 may be any device that includes at least two electrical conductors or plates that are separated by a dielectric material such that the dielectric material stores energy when polarized by an electrical field. In some examples, capacitor 310 is a ceramic capacitor, a film or power film capacitor, an electrolytic capacitor, an integrated capacitor, a power capacitor, or a variable capacitor. In some examples, the dielectric of the capacitor comprises glass, ceramic, plastic film, air, vacuum, paper, mica, or oxide layers.

In the example of FIG. 4, the gain of differentiating circuit 102 is programmed via current mirror 304 comprising a selectable number of output transistors M0-Mk. By selecting one or more transistors of output transistors M0-Mk, the current mirror factor may be programmed with values ranging from 1 to K, wherein K indicates the number of transistors Mk in the current mirror and may be any integer. Typically, K is a factor of 1, 2, 3, 4 selected to adjust the gain of the compensation loop.

Further, in the example of FIG. 4, the mirror factor 1:M of the high-side current mirror between transistor Mh1 310A and Mh2 310B affects the compensation loop gain of the differentiating circuit 102. In one example, the ratio of transistor 310A to transistor 310B is 1:1. In another example, the ratio of transistor 310A to transistor 310B is greater than one. In yet another example, the ratio of transistor 310A to transistor 310B is less than one.

In the example of FIG. 4, the output current of current mirror 304 is added to the main control current $i_{ctrl}$ at a low impedance node of the circuit (e.g., node 101). Doing so ensures that the compensation loop delay time is minimized. As described above, ensuring that the compensation loop delay is much shorter than the rising edge of the output voltage at output gate 112 ensures that the gate driver 300 may adequately compensate for current dips due to rapidly changing common mode voltage transients. In testing, it has been determined that as the compensation loop delay decreases, the current dip decreases both in amplitude and time.

In the example of FIG. 4, a fully-compensated gate driver circuit requires a gain calculated by the following equation:

$$G = m*k = 1 + \frac{C_{gd}}{C_c}$$

In the examples described herein, the gate driver circuit functions only when the gain is greater than one. If k and m are given parameters, the value of the compensation capacitor 310 is calculated by the following equation:

$$C_c = \frac{c_{gd}}{k*m - 1}$$

Accordingly, a gate driver 300 according to the techniques of the disclosure may provide a constant output current during a short common mode voltage rise time. Further, by providing a compensation current in the manner described below, the gate driver 300 as disclosed herein compensates for parasitic displacement current during the common mode voltage rise time. Thus, in contrast to other gate driver circuits, such a gate driver circuit as disclosed herein may have an improved common-mode transient immunity and may not suffer the same current dips in output current during the common mode voltage rise time.

The architecture of gate driver 300 illustrated in FIG. 4 is shown as an example. The techniques as set forth in this disclosure may be implemented in the example gate driver 300 of FIG. 4, as well as other types of gate driver circuits not described specifically herein. Nothing in this disclosure should be construed so as to limit the techniques of this disclosure to the example architecture illustrated by FIG. 4.

Figure 5:
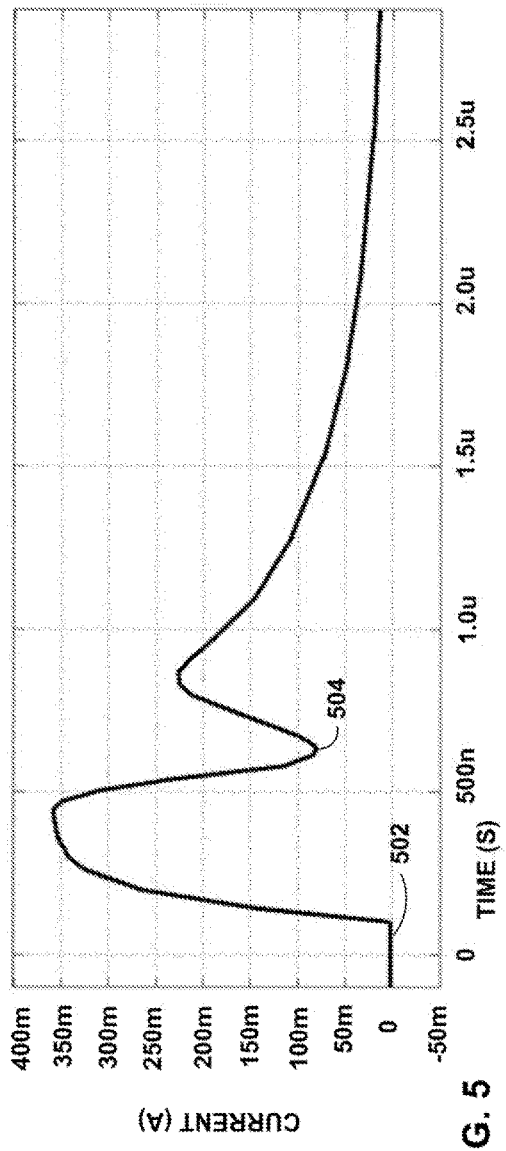
FIG. 5 is a chart illustrating an example output gate current provided by another gate driver exhibiting current dip due to displacement current.

FIG. 5 is a chart illustrating an example output gate current 502 provided by another gate driver exhibiting current dip due to displacement current. As depicted by FIG. 5, during the common mode voltage rise time, a typical gate driver circuit experiences rapidly changing common mode voltage transients on its output gate. These common mode voltage transients cause a displacement current to flow away from the output gate due to parasitic capacitance between the gate and the drain of the power transistor of the gate driver circuit. Accordingly, the gate of the gate driver circuit experiences a large dip 504 in output current, which may fail to deliver sufficient power to the load, or cause instability in the operation of the load (e.g., a motor which fails to operate).

Figure 6:
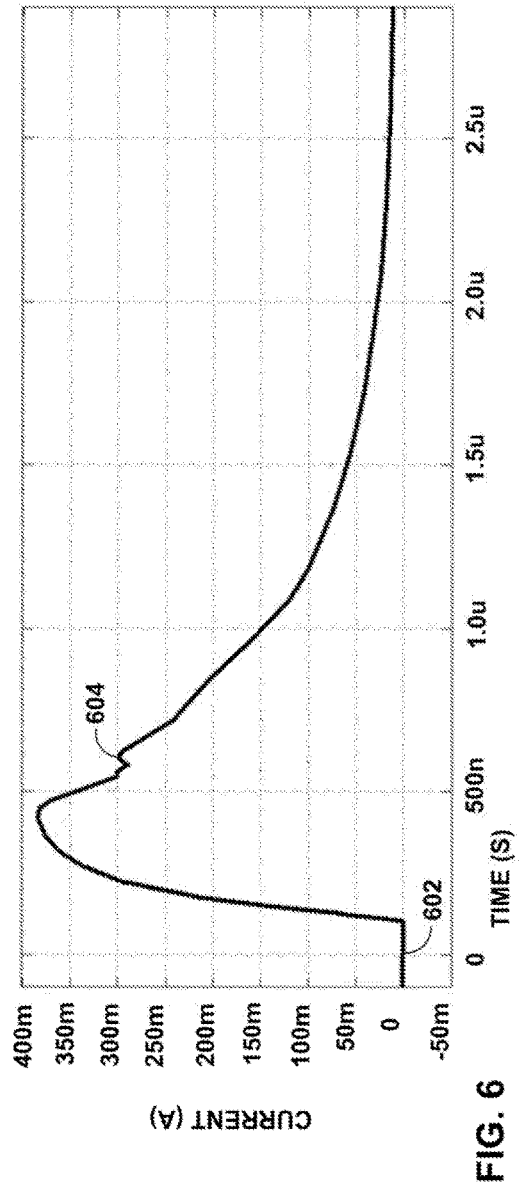
FIG. 6 is a chart illustrating an example output gate current provided by the example gate driver of FIG. 1 in accordance with the techniques of the disclosure.

FIG. 6 is a chart illustrating an example output gate current 602 provided by the example gate driver of FIG. 2 in accordance with the techniques of the disclosure. The example of FIG. 6 is described with respect to FIG. 2. However, the gate drivers 200 and 300 of FIGS. 3 and 4, respectively, may operate in a substantially similar fashion.

As depicted by FIG. 6, the example gate driver 100 of FIG. 2, during the common mode voltage rise time, gate driver 100 experiences rapidly changing common mode voltage transients at its output gate 112. These common mode voltage transients cause parasitic displacement current $i_{gd}$ 107 to flow away from the output gate 112 due to parasitic capacitance 116 between the gate and the drain of transistor 110 of the gate driver circuit.

According to the techniques of the disclosure, gate driver 100 detects the parasitic current $i_{gd}$ 107 by detecting changes in input current $i_{cx}$. Adder circuit 109 sums an input from source voltage $V_{cp}$ and input current $i_{cx}$, and provides the sum as an output to differentiating circuit 102. In response to the summed output, indicative of the detected parasitic current, differentiating circuit 102 generates a sense current $I_{sense}$. Gain circuit 104 receives the sense current $I_{sense}$ (alternatively, $V_{sense}$) and multiplies the sense value by a factor of N to generate a compensation current $i_{cy}$ 105. Accordingly, the parasitic displacement current $i_{gd}$ 107 is negated via a compensation current $i_{cy}$ 105. Thus, unlike the gate driver circuit of FIG. 5, as depicted at element 504 of FIG. 6, gate driver 100 maintains a consistent output current at gate 112 during the common mode voltage rise time 604.

Accordingly, a gate driver circuit according to the techniques of the disclosure may provide a constant output current during a short common mode voltage rise time. Further, by providing a compensation current in the manner described below, the gate driver circuit as disclosed herein compensates for parasitic displacement current during the common mode voltage rise time. Thus, in contrast to other gate driver circuits, such a gate driver circuit as disclosed herein may have an improved common-mode transient immunity and may not suffer the same current dips in output current during the common mode voltage rise time.

The architecture of gate driver 100 illustrated in FIG. 6 is shown as an example. The techniques as set forth in this disclosure may be implemented in the example gate driver 100 of FIG. 2, as well as other types of gate driver circuits not described specifically herein. For example, gate driver circuits 200 and 300 of FIGS. 3 and 4, respectively, may provide an output gate current substantially similar to the output gate current of gate driver 100 depicted in FIG. 6.

Nothing in this disclosure should be construed so as to limit the techniques of this disclosure to the example architecture illustrated by FIG. 6.

Figure 7:
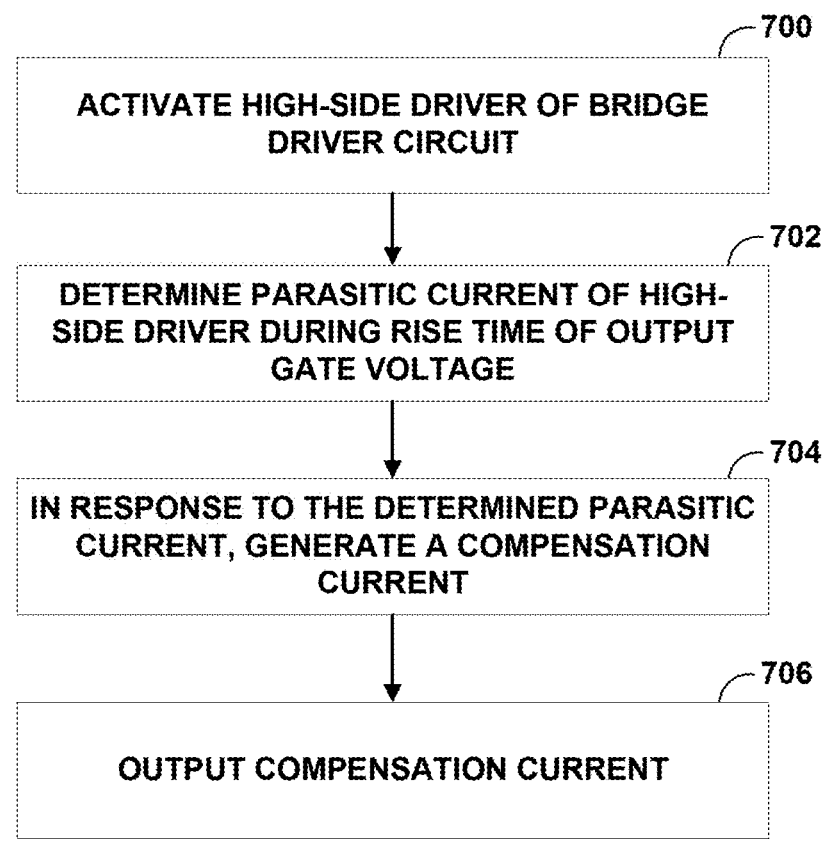
FIG. 7 is a flowchart illustrating an example operation for generating a compensation current in response to a parasitic displacement current according to the techniques of the disclosure.

FIG. 7 is a flowchart illustrating an example operation for generating a compensation current in response to a parasitic displacement current according to the techniques of the disclosure. The example of FIG. 7 is described with respect to FIG. 2. However, the gate drivers 200 and 300 of FIGS. 3 and 4, respectively, may operate in a substantially similar fashion.

According to the techniques of the disclosure, when constant current source 106 turns on (700), a rising edge in output voltage at output gate 114 is created. During this rising edge, gate driver 100 experiences rapidly changing common mode voltage transients which induce current dips in node 101. In other words, due to the parasitic capacitance $C_{gd}$, during the rising edge of output voltage at output gate 114, current flows into capacitor $C_{gd}$ as displacement current $i_{gd}$, which reduces current output $i_{rgs}$ to the output gate 114. Typically, these current dips are caused by displacement current due to gate-drain capacitance $C_{gd}$ 116 of an output transistor (e.g., parasitic displacement current $i_{gd}$).

Gate driver 100 detects the parasitic current $i_{gd}$ 107 by detecting changes in input current $i_{cx}$ (702). Adder circuit 109 sums an input from source voltage $V_{cp}$ and input current $i_{cx}$, and provides the sum as an output to differentiating circuit 102. In response to the summed output, indicative of the detected parasitic current, differentiating circuit 102 generates a sense current $I_{sense}$ that is approximately proportional to the slew rate of the output voltage.

Gain circuit 104 receives the sense current $I_{sense}$ (alternatively, $V_{sense}$) and multiplies the sense value by a factor of N to generate a compensation current $i_{cy}$ 105 (704). Gain circuit 104 outputs the compensation current $i_{cy}$ 105 into node 101, to compensate for the displacement current $i_{gd}$ (706). The compensation current $i_{cy}$ 105 flows into output gate 112 to prevent any displacement current $i_{gd}$ from diminishing the current output at gate 112.

Thus, during the rising edge of voltage $V_g$ on output gate 114, the parasitic displacement current $i_{gd}$ 107 is negated via a compensation current $i_{cy}$ 105, as described above. Thus, the compensation current $i_{cy}$ 105 flowing into node 101 is substantially equal to the sense current $i_{cx}$ 103 and parasitic displacement current $i_{gd}$ 107 flowing from node 101. Accordingly, the difference between the voltage $V_g$ of the gate of transistor 112 and the voltage $V_s$ of the source of transistor 112 remains the same. Furthermore, during this rising edge, the parasitic current $i_{cgs}$ due to capacitance $C_{gs}$ between the voltage $V_g$ of the gate of transistor 112 and the voltage $V_s$ of the source of transistor 112 is typically zero. Therefore, supply current $i_{ctrl}$ is equal to output gate current $i_{rgs}$ at output gate 112, even with varying levels of parasitic displacement current $i_{gd}$.

Accordingly, a gate driver circuit according to the techniques of the disclosure may provide a constant output current during a short common mode voltage rise time. Further, by providing a compensation current in the manner described below, the gate driver circuit as disclosed herein compensates for parasitic displacement current during the common mode voltage rise time. Thus, in contrast to other gate driver circuits, such a gate driver circuit as disclosed herein may have an improved common-mode transient immunity and may not suffer the same current dips in output current during the common mode voltage rise time.

The operation of gate driver 100 illustrated in FIG. 7 is shown as an example. The techniques as set forth in this disclosure may be implemented in the example operation of FIG. 7, as well as other types of operations not described specifically herein. For example, gate driver circuits 200 and 300 of FIGS. 3 and 4, respectively, may operate substantially similar to gate driver 100 depicted in FIG. 7. Nothing in this disclosure should be construed so as to limit the techniques of this disclosure to the example operation illustrated by FIG. 7.

The following examples may illustrate one or more aspects of the disclosure.

Example 1

A method, comprising: activating, by a bridge driver circuit for a direct-current (DC) motor, a high-side driver of the bridge driver circuit; determining, by the bridge driver circuit, a parasitic current of the high-side driver during a rise time of an output gate voltage of the high-side driver; in response to the determined parasitic current, generating, by the bridge driver circuit, a compensation current; and outputting, by the bridge driver circuit and to the output gate of the of the high-side driver, the compensation current.

Example 2

The method of example 1, wherein the parasitic current of the high-side driver is a parasitic gate-drain current of an output transistor of the high-side driver.

Example 3

The method according to any of examples 1-2, wherein determining the parasitic current of the high-side driver comprises determining a slew rate of an output gate voltage of the high-side driver at the output gate.

Example 4

The method according to any of examples 1-3, wherein the compensation current is proportional to a voltage slew rate at the output gate of the output transistor.

Example 5

The method of example 4, wherein the compensation current is proportional to the voltage slew rate according to an adjustable gain.

Example 6

The method according to any of examples 1-5, wherein outputting the compensation current to the output gate of the high-side driver comprises outputting, by a compensation capacitor of the bridge driver and to the output gate of the high-side driver, the compensation current.

Example 7

The method according to any of examples 1-6, wherein the bridge driver circuit is an adaptive gate driver circuit.

Example 8

The method according to any of examples 1-7, wherein a monolithic integrated circuit comprises the bridge driver circuit.

Example 9

The method according to any of examples 1-8, wherein the bridge driver circuit for the DC motor is a bridge driver circuit for one of an H-bridge DC motor and a 3-phase brushless DC motor.

Example 10

A bridge driver for a direct-current (DC) motor configured to: activate a high-side driver of the bridge driver circuit; measure a parasitic current of the high-side driver during a rise time of an output gate voltage of the high-side driver; in response to the measured parasitic current, generate a compensation current; and output, to the output gate of the of the high-side driver, the compensation current.

Example 11

The bridge driver of example 10, wherein the parasitic current of the high-side driver is a parasitic gate-drain current of an output transistor of the high-side driver.

Example 12

The bridge driver according to any of examples 10-11, wherein the bridge driver configured to determine the parasitic current of the high-side driver during the rise time of an output gate voltage of the high-side driver is further configured to determine a slew rate of an output gate voltage of the high-side driver at the output gate during the rise time of an output gate voltage of the high-side driver.

Example 13

The bridge driver according to any of examples 10-12, wherein the compensation current is proportional to a voltage slew rate at the output gate of the output transistor.

Example 14

The bridge driver of example 13, wherein the compensation current is proportional to the voltage slew rate according to an adjustable gain.

Example 15

The bridge driver according to any of examples 10-14, wherein the bridge driver configured to output, to the output gate of the of the high-side driver, the compensation current comprises a compensation capacitor of the bridge driver configured to output, to the output gate of the high-side driver, the compensation current.

Example 16

The bridge driver according to any of examples 10-15, wherein the bridge driver circuit is an adaptive gate driver circuit.

Example 17

The bridge driver according to any of examples 10-16, wherein a monolithic integrated circuit comprises the bridge driver circuit.

Example 18

The bridge driver according to any of examples 10-17, wherein the bridge driver circuit for the DC motor is a bridge driver circuit for one of an H-bridge DC motor and a 3-phase brushless DC motor.

Example 19

A system, comprising: a bridge driver for a direct-current (DC) motor configured to: activate a high-side driver of the bridge driver circuit; determine a parasitic current of the high-side driver during a rise time of an output gate voltage of the high-side driver; in response to the determined parasitic current, generate a compensation current; and output, to the output gate of the of the high-side driver, the compensation current; and the DC motor.

Example 20

The system of example 19, wherein the parasitic current of the high-side driver is a parasitic gate-drain current of an output transistor of the high-side driver.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

In still other examples, the techniques described in this disclosure may also be embodied or encoded in software and stored as instructions in a computer-readable storage medium. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A bridge driver for a direct-current (DC) motor configured to:
   activate a driver of the bridge driver circuit;
   determine a parasitic current of the driver during a rise time of an output gate voltage of the driver, wherein the parasitic current of the driver is a parasitic gate-drain current of an output transistor of the driver;
   generate a compensation current based on the determined parasitic current; and
   output, to the output gate of the driver, the compensation current.

2. The bridge driver of claim 1, wherein the bridge driver configured to output, to the output gate of the driver, the compensation current comprises a compensation capacitor of the bridge driver configured to output, to the output gate of the driver, the compensation current.

3. The bridge driver of claim 1, wherein the bridge driver circuit is an adaptive gate driver circuit.

4. The bridge driver of claim 1, wherein a monolithic integrated circuit comprises the bridge driver circuit.

5. The bridge driver of claim 1, wherein the bridge driver circuit for the DC motor is a bridge driver circuit for one of an H-bridge DC motor and a 3-phase brushless DC motor.

6. A bridge driver for a direct-current (DC) motor configured to:
   activate a driver of the bridge driver circuit;
   determine a parasitic current of the driver during a rise time of an output gate voltage of the driver, wherein, to determine the parasitic current of the driver during the rise time of the output gate voltage of the driver, the bridge driver is further configured to determine a slew rate of an output gate voltage of the driver at the output gate during the rise time of the output gate voltage of the driver;
   generate a compensation current based on the determined parasitic current; and
   output, to the output gate of the driver, the compensation current.

7. The bridge driver of claim 6, wherein the compensation current is proportional to the slew rate of the output gate voltage of an output transistor of the driver.

8. The bridge driver of claim 7, wherein the compensation current is proportional to the slew rate according to an adjustable gain.

9. A method, comprising:
   activating, by a bridge driver circuit for a direct-current (DC) motor, a driver of the bridge driver circuit;
   determining, by the bridge driver circuit, a parasitic current of the driver during a rise time of an output gate voltage of the driver, wherein the parasitic current of the driver is a parasitic gate-drain current of an output transistor of the driver;
   generating, by the bridge driver circuit, a compensation current based on the determined parasitic current; and
   outputting, by the bridge driver circuit and to the output gate of the driver, the compensation current.

10. The method of claim 9, wherein outputting the compensation current to the output gate of the driver comprises outputting, by a compensation capacitor of the bridge driver and to the output gate of the driver, the compensation current.

11. The method of claim 9, wherein the bridge driver circuit is an adaptive gate driver circuit.

12. The method of claim 9, wherein a monolithic integrated circuit comprises the bridge driver circuit.

13. The method of claim 9, wherein the bridge driver circuit for the DC motor is a bridge driver circuit for one of an H-bridge DC motor and a 3-phase brushless DC motor.

14. A method, comprising:
   activating, by a bridge driver circuit for a direct-current (DC) motor, a driver of the bridge driver circuit;
   determining, by the bridge driver circuit, a parasitic current of the driver during a rise time of an output gate voltage of the driver, wherein determining the parasitic current of the driver comprises determining a slew rate of an output gate voltage of the driver at the output gate;
   generating, by the bridge driver circuit, a compensation current based on the determined parasitic current; and
   outputting, by the bridge driver circuit and to the output gate of the driver, the compensation current.

15. The method of claim 14, wherein the compensation current is proportional to the slew rate of the output gate voltage of an output transistor of the driver.

16. The method of claim 15, wherein the compensation current is proportional to the slew rate according to an adjustable gain.

* * * * *